United States Patent
Sugita et al.

(10) Patent No.: US 7,393,398 B2
(45) Date of Patent: Jul. 1, 2008

(54) OIL-BASED INKS FOR INKJET PRINTERS

(75) Inventors: Yukio Sugita, Yokohama (JP); Mitsuyoshi Tamura, Yokohama (JP)

(73) Assignee: The Inctec Inc., Yokohama-shi (JP)

( * ) Notice: Subject to any disclaimer, the term of this patent is extended or adjusted under 35 U.S.C. 154(b) by 179 days.

(21) Appl. No.: 11/169,660

(22) Filed: Jun. 30, 2005

(65) Prior Publication Data

US 2007/0000409 A1 Jan. 4, 2007

(51) Int. Cl.
*C09D 11/02* (2006.01)

(52) U.S. Cl. .................................... 106/31.66

(58) Field of Classification Search ............... 106/31.86
See application file for complete search history.

(56) References Cited

U.S. PATENT DOCUMENTS

| 6,379,444 | B1 * | 4/2002 | Adkins et al. ............... 106/31.6 |
| 2002/0086914 | A1 * | 7/2002 | Lee et al. ....................... 522/75 |
| 2007/0000409 | A1 | 1/2007 | Sugita et al. |

FOREIGN PATENT DOCUMENTS

JP 2003-96370 4/2003

OTHER PUBLICATIONS

U.S. Appl. No. 11/740,444, filed Apr. 26, 2007, Sugita, et al.

\* cited by examiner

*Primary Examiner*—J. A. Lorengo
*Assistant Examiner*—Veronica Faison-Gee
(74) *Attorney, Agent, or Firm*—Oblon, Spivak, McClelland, Maier & Neustadt, P.C.

(57) ABSTRACT

An oil-based ink for piezoelectric inkjet printers contains a binder resin, a pigment and a solvent. The solvent contains a cyclic ester and a compound represented by the following formula (1):

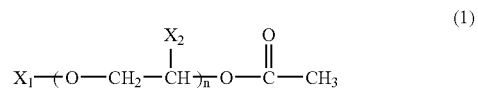

(1)

wherein $X_1$ represents an alkyl group, $X_2$ represents a hydrogen atom or an alkyl group, and n stands for an integer of from 1 to 4. The amount of the cyclic ester is from 1 to 60 parts by weight per 100 parts by weight of the compound represented by the formula (1). Preferably, the cyclic ester is a compound represented by the following formula (2):

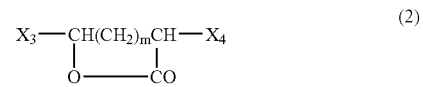

(2)

wherein $X_3$ and $X_4$ each independently represents a hydrogen atom or a $C_{1-7}$ alkyl or alkenyl group, and m stands for an integer of from 1 to 3.

11 Claims, No Drawings

OIL-BASED INKS FOR INKJET PRINTERS

FIELD OF THE INVENTION

This invention relates to oil-based inks of the pigment type for piezoelectric inkjet printers, which may hereinafter be referred to simply as "inks", and specifically to inks free from ink clogging at printhead nozzles, excellent in ejectability and ejection recoverability, and also superb in fixing properties and drying properties on recording media.

DESCRIPTION OF THE BACKGROUND

Conventional inkjet recording methods include the continuous method and the drop-on-demand method. According to the former method, continuously-ejected inks are selectively caused to strike a medium. According to the latter method, on the other hand, inks are selectively ejected. In recent years, however, drop-on-demand printers have become the mainstream. These drop-on-demand printers can be divided into two types, one being the bubble jet system that inks are rapidly heated to eject them by the resulting bubbles, and the other being the piezoelectric system that inks are ejected using ceramics (piezoelectric elements) which deform when voltages are applied.

The above-described piezoelectric system, which uses conventional oil-based inks, ejects the inks by using piezoelectric elements as pumps to convert electric energy into mechanical energy, and basically, can eject various ink materials. However, this system ejects inks depending on the existence or non-existence of signals. At the edge (end faces) of nozzles through which the ejection of the inks is suspended, the solvents in the inks evaporate. As a consequence, ink clogging may take place by the deposition of solid components from the inks or the ejection of the inks may be inhibited by viscosity increases of the inks within the nozzles due to concentration of the inks. It has, accordingly, been required to frequently conduct maintenance work. In particular, inks which are useful in the production of prints for outdoor use employ, as printing media, non-absorbent media, namely, plastic films such as polyvinyl chloride sheets. They, therefore, use as an ink solvent a solvent having relatively high volatility. As a consequence, the inks dry up rapidly, resulting in marked occurrence of ink clogging.

When the air dissolved in an ink exceeds a certain level, microbubbles which occur in printhead nozzles as a result of the development of cavitation by high-frequency oscillations of piezoelectric elements absorb pressures, leading to a reduction in drive response. In addition, ejection troubles may be induced by the production of bubbles within nozzles as a result of changes in the surrounding air temperature.

With a view to overcoming the above-mentioned problems, inkjet pigment inks making use of high-boiling solvents have been proposed as substitutes for conventional oil-based inks (JP-A-2003-96370). However, the inks disclosed in JP-A-2003-96370 use, as a non-aqueous organic solvent, only glycol ether esters either singly or in combination in order to avoid ink viscosity increase or pigment flocculation during storage. As a consequence, they are equipped with improved solubility of solid components such as resins in the solvents but, when employed in such piezoelectric inkjet printers as mentioned above, no sufficient ink ejectability is available. Further, when printing is resumed subsequent to a temporary discontinuation, the ink ejection recoverability is lowered, thereby failing to provide prints of stable quality.

SUMMARY OF THE INVENTION

Therefore, an object of the present invention is to provide an oil-based ink of the pigment type for piezoelectric inkjet printers, which are free from ink clogging at printhead nozzles during printing, are excellent in ejectability and ejection recoverability, and are also superb in fixing properties and drying properties on recording media.

The above-described object can be achieved by the present invention to be described hereinafter. Described specifically, the present invention provides an oil-based ink for piezoelectric inkjet printers, said ink comprising a fixing (binder) resin, a pigment and a solvent, wherein said solvent comprises a cyclic ester and a compound (hereinafter called "the compound A") represented by the following formula (1):

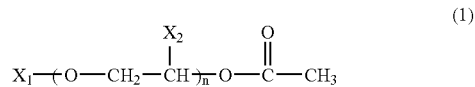

$$X_1 \!\!-\!\!(O\!\!-\!\!CH_2\!\!-\!\!CH)_n\!\!-\!\!O\!\!-\!\!\overset{O}{\underset{\|}{C}}\!\!-\!\!CH_3 \quad (1)$$

wherein $X_1$ represents an alkyl group, $X_2$ represents a hydrogen atom or an alkyl group, and n stands for an integer of from 1 to 4; and an amount of said cyclic ester is from 1 to 60 parts by weight per 100 parts by weight of said compound represented by the formula (1).

The present inventors have proceeded with an extensive investigation to resolve the above-described problems. As a result, it has been found that, especially when employed in piezoelectric inkjet printers, the above-described ink, compared with oil-based pigment inks making use of conventional solvents, is free from ink clogging at printhead nozzles which would otherwise take place at the edge of the printhead nozzles during printing by the deposition of solid components from the ink, is excellent in ink ejection recoverability even when printing is resumed subsequent to a temporary discontinuation, is free from a reduction in ink ejectability which would otherwise take place by a viscosity increase of the ink within the nozzles as a result of a concentration of the ink, and is superb in fixing properties and drying properties on recording media.

According to the present invention, the use of a specific mixed solvent in place of a solvent in an oil-based ink of the pigment type has made it possible to provide an ink which, especially when employed in a piezoelectric inkjet printer, is free from the deposition of solid components from the ink at the edge of printhead nozzles, is free from a viscosity increase of the ink within the nozzles as a result of a concentration of the ink, and excellent in the ejectability and ejection recoverability from the printhead nozzles and also in the fixing properties and drying properties on recording media.

As the ink according to the present invention is free from ink clogging at printhead nozzles even when used in continued printing and also retains good ink ejection recoverability even when the printheads are left over between printing operations, it is excellent in ejectability, fixing properties and drying properties and therefore, is effectively usable as an ink for piezoelectric inkjet printers.

DETAILED DESCRIPTION OF THE PREFERRED EMBODIMENTS

The present invention will next be described in further detail based on best modes for carrying out the present invention. The solvent which primarily characterizes the present invention is a mixture of the compound A and the cyclic ester. The amount of the cyclic ester is from 1 to 60 parts by weight per 100 parts by weight of the compound A. Inks making use of the compound A or the cyclic ester as the sole solvent therein, respectively, are sufficient neither in ejectability from printhead nozzles nor in fixing properties and drying properties on recording media. When printing with the ink of the present invention on a piezoelectric inkjet printer, the combined use of these compound A and cyclic ester at an appropriate ratio as an ink solvent in the present invention makes it possible to inhibit the deposition of solid components from the ink at nozzle edge and the viscosity increase of the ink due to a concentration of the ink within the nozzles, thereby preventing ink clogging of the nozzles and improving the ejectability and ejection recoverability.

If the amount of the cyclic ester is too much, the resulting ink is provided with reduced pigment dispersion and storage stability, and depending on the kind of a recording medium, ink repelling takes place. If the amount of the cyclic ester is too little, on the other hand, deposition of solid components from the ink and a viscosity increase of the ink due to a concentration of the ink within nozzles are induced, leading to significant reductions in the prevention of ink clogging at the nozzles and also in ink ejectability and ejection recoverability.

Examples of the compound A include the monomethyl ether acetate, monoethyl ether acetate and monobutyl ether acetate of ethylene glycol, the monomethyl ether acetate of propylene glycol, the n-propyl ether acetate and n-butyl ether acetate of diethylene glycol, and the ethyl ether acetate and n-butyl ether acetate of triethylene glycol, with ethylene glycol monobutyl ether acetate being particularly preferred.

The cyclic ester is used to inhibit the deposition of solid components from the ink and the viscosity increase of the ink due to the concentration of the ink within nozzles and hence, to further improve the ink ejectability and ejection recoverability, because these advantageous effects cannot be brought about to satisfactory effect if the compound A should be used singly.

Examples of the cyclic ester include those containing an ester functional group in rings and being in a liquid format room temperature, such as β-lactones, γ-lactones, δ-lactones and ε-lactones, with cyclic ester compounds represented by the following formula (2) being preferred:

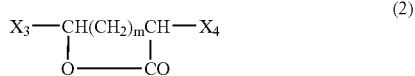

(2)

wherein $X_3$ and $X_4$ each independently represents a hydrogen atom or a $C_{1-7}$ alkyl or alkenyl group, and m stands for an integer of from 1 to 3.

Specific examples of the cyclic ester represented by the formula (2) include γ-lactones such as γ-butyrolactone, γ-valerolactone, γ-caprolactone, γ-caprylolactone and γ-laurolactone; δ-lactones such as δ-valerolactone; and ε-lactones such as ε-caprolactone. Among the above-exemplified lactones, particularly preferred are γ-butyrolactone and/or γ-valerolactone.

The sum of the compound A and cyclic ester can preferably account for 80 to 98 wt. % of the whole ink. A sum greater than the upper limit results in the provision of the resulting ink with reduced printability, while a sum smaller than the lower limit induces the provision of the resulting ink with an increased viscosity, leading to a reduction in the ink ejectability from nozzles.

As the compound A and cyclic ester, those having boiling points of from 130 to 250° C., respectively, can be used preferably. Excessively high boiling points lead to reductions in drying properties, inducing blocking or the like of prints. Unduly low boiling points, on the other hand, result in excessively fast drying, causing ink clogging at printhead nozzles. Boiling points outside the above-described range, therefore, result in reduced printability.

Described specifically, the binder resin for use in the present invention is a water-insoluble resin which serves to fix the pigment as a colorant on a printing medium, and is a known, natural or synthetic resin soluble in the compound A and cyclic ester. Any known, natural or synthetic resin can be used insofar as it does not impede the object of the present invention. Examples of the binder resin include acrylic resins; vinyl resins such as vinyl chloride/vinyl acetate copolymer resins, polyvinyl acetate resins, and butyral resins; polyester resins; polyamide resins; cellulose-based resins; epoxy resins; rosin derivatives such as rosin-modified phenol resins; and petroleum resins. Among these, preferred are acrylic resins and vinyl chloride/vinyl acetate copolymer resins. These binder resins can be used either singly or in combination.

Illustrative of the acrylic resins are polymers and copolymers of (meth)acrylate (it is to be noted that the term "(meth) acrylate" as used herein means both acrylate and methacrylate). Examples of the (meth)acrylate include alkyl(meth) acrylates such as ethyl, propyl and butyl(meth)acrylates; and hydroxyalkyl(meth)acrylates such as hydroxymethyl, hydroxyethyl, hydroxypropyl, hydroxybutyl and hydroxypentyl(meth)acrylates. Specific examples of the polymers and copolymers include methyl methacrylate polymer, methyl methacrylate/butyl methacrylate copolymer, methyl methacrylate/butyl acrylate/hydroxyethyl methacrylate/ methacrylic acid copolymer, styrene/(meth)acrylate copolymers, copolymers of (meth)acrylate as a principal component with comonomers such as acrylic acid, methacrylic acid, styrene, acrylamide, vinyltoluene, glycidyl methacrylate and hydroxyethyl acrylate, and blends thereof. As one example of the above-described acrylic resins, "PARALOID B-66" (trade name, product of Rohm and Haas Company) can be used in the present invention.

Illustrative of the vinyl chloride/vinyl acetate copolymer resins are vinyl chloride/vinyl acetate copolymer, vinyl chloride/vinyl acetate/maleic acid copolymer and vinyl chloride/ vinyl acetate/vinyl alcohol copolymer, and blends thereof. As one example of the vinyl chloride/vinyl acetate copolymer, "VYHH" (trade name, product of Dow Chemical Japan, Ltd.) can be used in the present invention.

The above-exemplified acrylic resins and vinyl chloride/ vinyl acetate copolymer resins can be used either singly on in combination. When an acrylic resin and a vinyl chloride/vinyl acetate copolymer are used in combination, their blend ratio (acrylic resin/(vinyl chloride/vinyl acetate copolymer)) can preferably range from 1/1 to 9/1 (by weight). Such a binder resin can be used preferably in a proportion of from 1 to 10 wt. % based on the whole ink.

Examples of the pigment for use in the ink of the present invention include phthalocyanine pigments such as phthalocyanine blue and phthalocyanine green; carbon black; pyranthrone pigments such as pyranthrone orange and pyranthrone red; soluble azo pigments such as permanent red 2B, pigment scarlet and lithol red; insoluble azo pigments such as benzidine yellow, Hansa yellow and toluidine red; quinophthalone pigments such as quinophthalone yellow; organic pigments such as thioindigo, benzimidazolone, anthraquinone, dioxazine, diketopyrrolopyrrole, isoindolinone and quinacridone pigments; and inorganic pigments such as titanium dioxide, ultramarine, Prussian blue, red iron oxide, zinc white, calcium carbonate and barium sulfate. Such a pigment can be used preferably in a proportion of from 0.5 to 8 wt. % based on the whole ink.

In the ink of the present invention, one or more of additives such as high-molecular dispersants, surfactants, plasticizers, antistatic agents, viscosity modifiers, defoaming agents, antioxidants and ultraviolet absorbers can be added and used to extents not impairing the achievement of the object of the present invention. Illustrative of the high-molecular dispersants are those formed of a polyester, polyacrylic, polyurethane, polyamine or polycaprolactone macromolecule as a principal chain and having, as side chains, polar groups such as amino, carboxyl, sulfo or hydroxyl groups, with polyester-based, high-molecular dispersants being preferred.

The ink according to the present invention is prepared by kneading and dispersing the above-described various components into a uniform mixture by a known method. As one example of its preparation method, the dispersant and pigment are added to the solvent, and are kneaded and dispersed with 0.3-mm zirconia beads for 3 hours into a uniform pigment dispersion. The binder resin and solvent are then added to the pigment dispersion to prepare the ink. Preferably, the ink is prepared such that it has a viscosity of from 8 to 15 mPa·s at 25° C. and a flash point of not lower than 60° C. It is to be noted that ink viscosity is a value as measured by a falling ball viscometer ("AMVn", trade name; manufactured by Nihon SiberHegner K.K.). An excessively high viscosity tends to develop ink clogging at printhead nozzles, and requires heating of printheads to lower the viscosity. This, however, facilitates evaporation of the solvent from the ink, resulting in increased ink clogging. An unduly low ink viscosity, on the other hand, leads to a reduction in printability. Printing on a known recording medium such as a plastic film, for example, a polyvinyl chloride film with the ink can be performed using an ordinary piezoelectric inkjet printer.

The present invention will next be described more specifically based on examples and comparative examples, in which the designations of "part" or "parts" and "%" are on a weight basis unless otherwise specifically indicated. It should be borne in mind that the present invention is not limited to or by the following examples.

EXAMPLES 1-4

Invention Inks R1 to R4 were prepared by proportioning the below-described binder resin a, pigment b and solvent c as shown in Table 1 and then kneading them into uniform mixtures such that they would have viscosities in a range of from 8 to 15 mPa·s at 25° C. The binder resin a, pigment b and solvent c in Table 1 are as follows:

Binder resin a
   a1: acrylic resin ("PARALOID B-66", trade name; product of Rohm and Haas Company)
   a2: vinyl resin ("VYHH", trade name; product of Dow Chemical Japan, Ltd.)

Pigment b
   Phthalocyanine

Solvent c
   c1: Ethylene glycol monobutyl ether acetate
   c2: γ-Butyrolactone
   c3: γ-Valerolactone

TABLE 1

| | | | Example | | | |
|---|---|---|---|---|---|---|
| | | | 1 | 2 | 3 | 4 |
| | Ink | | R1 | R2 | R3 | R4 |
| Components | Binder resin a | a1 | 8.0 | — | 4.0 | 4.0 |
| | | a2 | — | 6.0 | 4.0 | 4.0 |
| | Pigment b | | 3.0 | 3.0 | 3.0 | 3.0 |
| | Solvent c | c1 | 57.5 | 59.5 | 57.5 | 57.5 |
| | | c2 | 30.0 | — | 30.0 | 15.0 |
| | | c3 | — | 30.0 | — | 15.0 |
| | Polyester-based, high-molecular dispersant | | 1.5 | 1.5 | 1.5 | 1.5 |

It is to be noted that the values in the table are the numbers of parts.

COMPARATIVE EXAMPLE 1

Comparative Ink S1 was prepared in a similar manner as in Example 2 except that no γ-valerolactone was used and ethylene glycol monobutyl ether acetate (59.5 parts) was replaced by propylene glycol monomethyl ether acetate (89.5 parts).

COMPARATIVE EXAMPLE 2

Comparative Ink S2 was prepared in a similar manner as in Example 2 except that γ-valerolactone was replaced by cyclohexanone.

COMPARATIVE EXAMPLE 3

Comparative Ink S3 was prepared in a similar manner as in Example 3 except that γ-butyrolactone was replaced by cyclohexanone.

Separately using the individual inks obtained in the above examples and comparative examples, 200-μm polyvinyl chloride films ("WIDEFLEX-PL4", trade name; product of KANBO PRAS CORPORATION) were printed as printing media by an ejection evaluating testing machine with a piezoelectric Spectra Nova 256-nozzle printhead mounted thereon. Concerning the ink ejectability and the ink fixing properties and drying properties upon printing, the inks were ranked by the below-described measuring methods. The ranking results are shown in Table 2.

(Ink Ejectability)

After printing was performed for several seconds, the printing was discontinued and the printhead was left over. The printing was then resumed. Ink ejectability was ranked based on the left-over time of the printhead until five or more nozzles developed such a trouble in ink ejection that the ink was curvilinearly ejected from the nozzles immediately after the printing instead of flying straight or the nozzles became no longer possible to eject the ink.

Ranking Grades
   A: The left-over time of the printhead until five or more nozzles had developed a trouble in ink ejection was 5 minutes or longer.
   B: The left-over time of the printhead until five or more nozzles had developed a trouble in ink ejection was 2 minutes or longer but shorter than 5 minutes.
   C: The left-over time of the printhead until five or more nozzles had developed a trouble in ink ejection was shorter than 2 minutes.

(Fixing Properties of Ink)

Solid printing and character printing were performed. Shortly after the printing, the printed surface was rubbed with a finger, and the fixing properties were ranked megascopically on the basis of the extent of ink smearing and the extent of ink peeling-off on the printed surface.

Ranking Grades

A: Neither ink smearing nor ink peeling-off was observed on the printed surface.

B: Ink smearing and ink peeling-off were observed on the printed surface.

(Drying Properties of Ink)

Subsequent to printing, the dry-to-the-touch time of each printed surface was measured, and drying properties were ranked in accordance with the following standards.

Ranking Grades

A: The dry-to-the-touch time was shorter than 3 minutes.

B: The dry-to-the-touch time was 3 minutes or longer.

TABLE 2

| | | Example | | | | Comp. Ex. | | |
|---|---|---|---|---|---|---|---|---|
| | Ink | 1 R1 | 2 R2 | 3 R3 | 4 R4 | 1 S1 | 2 S2 | 3 S3 |
| Physical properties | Ink ejectability | A | A | A | A | C | B | B |
| | Ink fixing properties | A | A | A | A | A | A | A |
| | Ink drying properties | A | A | A | A | A | A | A |

From the ink ejectability of the above-described ranking results, it has been substantiated that each ink according to the present invention scarcely develops practical troubles of ink ejection from nozzles even when printing is repeated and that the ink has good ejection recoverability even when printheads are left over. From the fixing properties, it has also been substantiated that each ink according to the present invention has excellent adhesion to recording media. From the drying properties, it has also been substantiated that, even when continued printing is performed, no blocking of prints or the like takes place and stable printing can be performed.

The invention claimed is:

1. An oil-based ink for piezoelectric inkjet printers, said ink comprising:

a binder resin, a pigment and a solvent, wherein said solvent comprises at least one cyclic ester selected from the group consisting of γ-butyrolactone and γ-valerolactone, and ethylene glycol monobutyl ether acetate, wherein an amount of said cyclic ester is from 1 to 60 parts by weight per 100 parts by weight of said ethylene glycol monobutyl ether acetate, and said binder resin is a blend of an acrylic resin and a vinyl chloride-vinyl acetate copolymer resin at a weight ratio of from 1/1 to 9/1.

2. The ink according to claim 1, wherein a sum of said ethylene glycol monobutyl ether acetate and said cyclic ester accounts for 80 to 98 wt.% of the whole ink.

3. The ink according to claim 1, which has a viscosity of from 8 to 15 mPa·s at 25° C.

4. The ink according to claim 1, which has a flash point of not lower than 60° C.

5. The ink according to claim 1, wherein the binder resin is present in an amount of from 1 to 10 wt.% based on the total weight of the ink.

6. The ink according to claim 1, wherein the pigment is present in an amount of from 0.5 to 8 wt.% based on the total weight of the ink.

7. The ink according to claim 1, further comprising:

a polymeric dispersant.

8. The ink according to claim 1, wherein the binder resin is present in an amount of from 6 to 10 wt.% based on the total weight of the ink.

9. The ink according to claim 1, wherein the cyclic ester comprises γ-butyrolactone.

10. The ink according to claim 1, wherein the cyclic ester comprises γ-valerolactone.

11. The ink according to claim 1, wherein the cyclic ester comprises both γ-butyrolactone and γ-valerolactone.

* * * * *